United States Patent
Nishizawa

(10) Patent No.: US 12,528,511 B2
(45) Date of Patent: Jan. 20, 2026

(54) VEHICLE CONTROL DEVICE AND VEHICLE CONTROL METHOD THEREOF

(71) Applicant: Honda Motor Co., Ltd., Tokyo (JP)

(72) Inventor: Shogo Nishizawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 18/413,067

(22) Filed: Jan. 16, 2024

(65) Prior Publication Data

US 2024/0317269 A1 Sep. 26, 2024

(30) Foreign Application Priority Data

Mar. 20, 2023 (CN) .......................... 202310271602.X

(51) Int. Cl.
| | |
|---|---|
| *B60W 60/00* | (2020.01) |
| *B60W 10/20* | (2006.01) |
| *B60W 30/14* | (2006.01) |
| *B60W 50/02* | (2012.01) |
| *B60W 50/038* | (2012.01) |
| *B62D 6/00* | (2006.01) |

(52) U.S. Cl.
CPC ...... *B60W 60/00186* (2020.02); *B60W 10/20* (2013.01); *B60W 30/146* (2013.01); *B60W 50/0205* (2013.01); *B60W 50/038* (2013.01); *B62D 6/001* (2013.01); *B60W 60/0053* (2020.02); *B60W 2720/10* (2013.01)

(58) Field of Classification Search
CPC ........... B60W 60/00186; B60W 10/20; B60W 30/146; B60W 50/0205; B60W 50/038; B60W 60/0053; B60W 2720/10; B62D 6/001

See application file for complete search history.

(56) References Cited

U.S. PATENT DOCUMENTS

| | | | |
|---|---|---|---|
| 2018/0050672 A1* | 2/2018 | Pennala | B60T 8/17 |
| 2018/0345962 A1* | 12/2018 | Konishi | B60W 10/04 |
| 2021/0094575 A1* | 4/2021 | Sato | B60W 30/16 |
| 2023/0033041 A1* | 2/2023 | Grossheim | B62D 15/025 |
| 2023/0040044 A1* | 2/2023 | Kakas | B62D 5/0484 |
| 2024/0239357 A1* | 7/2024 | Iwaki | B60W 50/0205 |

FOREIGN PATENT DOCUMENTS

JP 7074193 5/2022

* cited by examiner

*Primary Examiner* — Mohamad O El Sayah
(74) *Attorney, Agent, or Firm* — JCIPRNET

(57) ABSTRACT

A vehicle control device and a vehicle control method thereof are provided in the disclosure. Whether an autonomous driving assistance device, a steer-by-wire device of a vehicle, or a power supply of the vehicle has malfunctioned are determined. When it is determined that the autonomous driving assistance device, the steer-by-wire device, or the vehicle's power supply has malfunctioned while the vehicle is executing autonomous driving, vehicle weakening control is executed. In response to malfunctioning of the autonomous driving assistance device, the steer-by-wire device, or the power supply of the vehicle, and whether the vehicle switches to manual driving mode, target vehicle speed limit of the vehicle is adjusted.

7 Claims, 4 Drawing Sheets

VEHICLE CONTROL DEVICE AND VEHICLE CONTROL METHOD THEREOF

CROSS-REFERENCE TO RELATED APPLICATION

This application claims the priority benefit of China application serial no. 202310271602.X filed on Mar. 20, 2023. The entirety of the above-mentioned patent application is hereby incorporated by reference herein and made a part of this specification.

BACKGROUND

Technical Field

The disclosure relates to a control device, and in particular relates to a vehicle control device and a vehicle control method thereof.

Description of Related Art

In recent years, efforts have been made to provide a friendly and sustainable transportation system for the disadvantaged participants in transportation. For example, how to further improve traffic safety and convenience through the use of autonomous driving technology is one significant direction of effort.

Traditionally, in vehicles with autonomous driving functions (level 3 or higher), the malfunction safety control (steer-by-wire weakening control) of only the malfunction of the steer-by-wire device and the malfunction safety control (autonomous driving weakening control) of the malfunction of the autonomous driving assistance devices other than the steer-by-wire device may be implemented independently. However, in practical applications, when the steer-by-wire device malfunctions during autonomous driving of the vehicle, the implementation of both the steer-by-wire weakening control and the autonomous driving weakening control is necessary.

SUMMARY

A vehicle control device and a vehicle control method thereof, which may make a vehicle with an autonomous driving function compatible with steer-by-wire weakening control and autonomous driving weakening control, are provided in the disclosure. This significantly improves the traveling safety of the vehicle, and may provide a sustainable transportation system that may enhance the safety and convenience of traffic.

The vehicle control device of the disclosure includes a steer-by-wire device, a malfunction diagnosis unit, and a vehicle speed control unit. The steer-by-wire device controls steering of the vehicle according to operation amount of a steering control device of the vehicle. The malfunction diagnosis unit determines whether the autonomous driving assistance device, the steer-by-wire device, or a power supply of the vehicle has malfunctioned. During an autonomous driving process of the vehicle, when the malfunction diagnosis unit determines that the autonomous driving assistance device, the steer-by-wire device, or the power supply of the vehicle has malfunctioned, the vehicle speed control unit executes vehicle weakening control. In response to malfunctioning of the autonomous driving assistance device, the steer-by-wire device, or the power supply of the vehicle, and whether the vehicle switches to manual driving mode, target vehicle speed limit of the vehicle is adjusted.

A vehicle control method of a vehicle control device is also provided in the disclosure, in which the following operation is included. Whether an autonomous driving assistance device, a steer-by-wire device of a vehicle, or a power supply of the vehicle has malfunctioned are determined. When it is determined that the autonomous driving assistance device, the steer-by-wire device, or the vehicle's power supply has malfunctioned while the vehicle is executing autonomous driving, vehicle weakening control is executed. In response to malfunctioning of the autonomous driving assistance device, the steer-by-wire device, or the power supply of the vehicle, and whether the vehicle switches to manual driving mode, target vehicle speed limit of the vehicle is adjusted.

Based on the above, in the embodiment of the disclosure, during the autonomous driving process of the vehicle, when the malfunction diagnosis unit determines that the steer-by-wire device, the autonomous driving assistance device, or the power supply of the vehicle has malfunctioned, vehicle weakening control is executed on the vehicle. In response to malfunctioning of the steer-by-wire device, the autonomous driving assistance device, or the power supply of the vehicle, and whether the vehicle switches to manual driving mode, target vehicle speed limit of the vehicle is adjusted. In this way, when the steer-by-wire device, the autonomous driving execution device, or the power supply of the vehicle has malfunctioned, the target vehicle speed limit may be adjusted to the speed corresponding to the autonomous driving weakening control. In the case that the steer-by-wire device or the power supply of the vehicle has malfunctioned, the target vehicle speed limit may be adjusted to the speed corresponding to the steer-by-wire weakening control when the vehicle switches to manual driving mode. In this way, vehicles with autonomous driving functions may be compatible with steer-by-wire weakening control and autonomous driving weakening control. This significantly improves the traveling safety of the vehicle, and may provide a sustainable transportation system that may enhance the safety and convenience of traffic.

In order to make the above-mentioned features and advantages of the disclosure comprehensible, embodiments accompanied with drawings are described in detail below.

DETAILED DESCRIPTION OF DISCLOSED EMBODIMENTS

Figure 1:
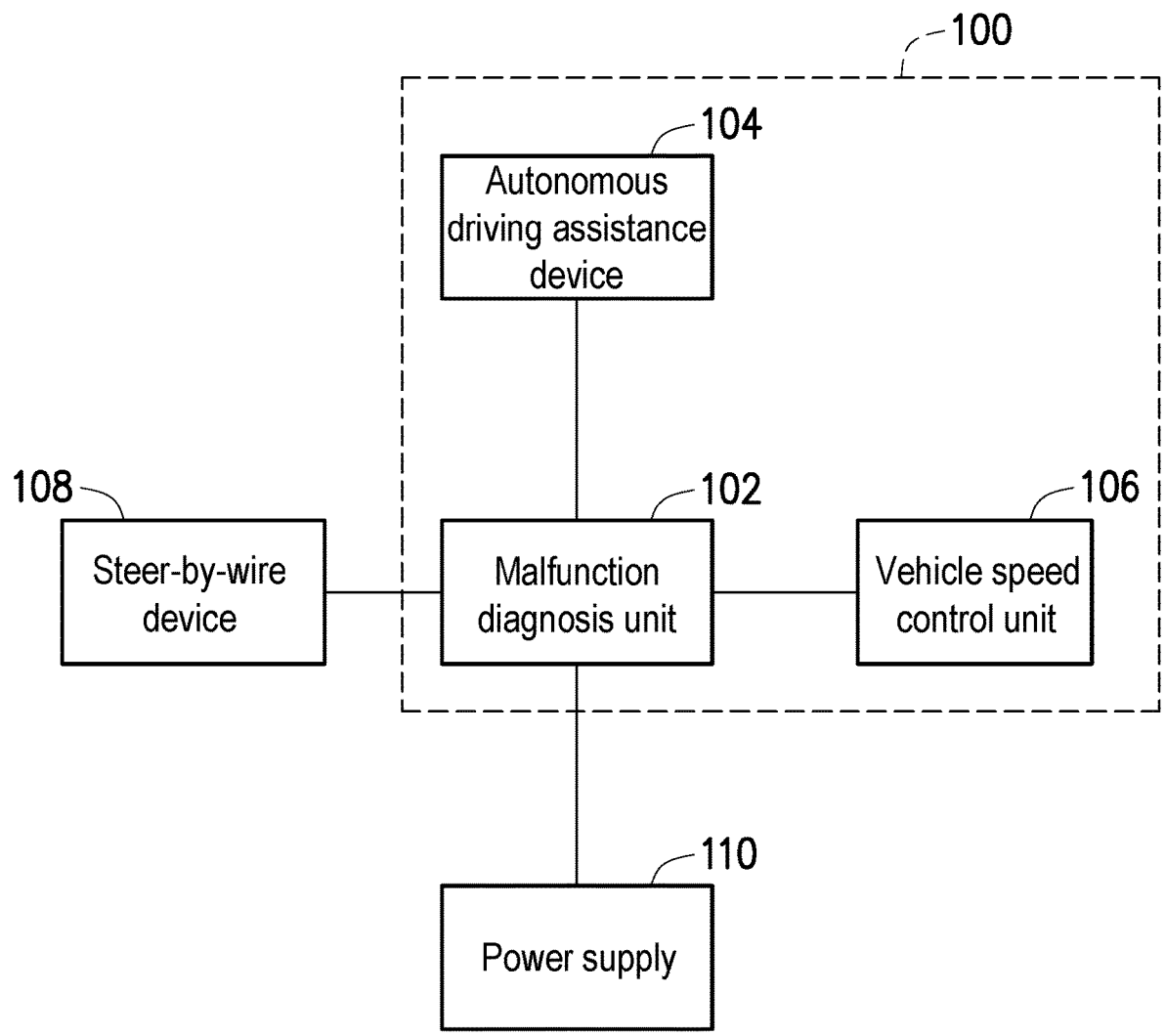
FIG. 1 is a schematic diagram of a vehicle control device according to an embodiment of the disclosure.

In order to make the content of the disclosure easier to understand, the following specific embodiments are illustrated as examples of the actual implementation of the disclosure. In addition, wherever possible, elements/components with the same reference numerals in the drawings and embodiments represent the same or similar parts.

In an embodiment of the disclosure, when the vehicle speed control unit executes the autonomous driving weakening control, the target vehicle speed limit is set to a first vehicle speed, and when the vehicle speed control unit executes the steer-by-wire weakening control, the target vehicle speed limit is set to a second vehicle speed. When the malfunction diagnosis unit determines that the autonomous driving assistance device has malfunctioned, the target vehicle speed limit is set to the first vehicle speed.

In one embodiment of the disclosure, when the malfunction diagnosis unit determines that the steer-by-wire device or the power supply of the vehicle has malfunctioned, the vehicle speed control unit sets the target vehicle speed limit to the first vehicle speed. When the target vehicle speed limit of the vehicle is set to the first vehicle speed due to malfunction of the steer-by-wire device or the power supply of the vehicle, and the vehicle switches from an autonomous driving mode to the manual driving mode while traveling, the target vehicle speed limit is set to the second vehicle speed.

In one embodiment of the disclosure, within a preset time period after the malfunction diagnosis unit determines that the steer-by-wire device or the power supply of the vehicle has malfunctioned, the vehicle speed control unit sets the target vehicle speed limit to the second vehicle speed.

In an embodiment of the disclosure, the second vehicle speed is greater than the first vehicle speed.

In one embodiment of the disclosure, when the malfunction diagnosis unit determines that the steer-by-wire device or the power supply of the vehicle has malfunctioned and the vehicle does not switch from the autonomous driving mode to the manual driving mode, the vehicle speed control unit continues to decelerate the vehicle to a stopped state. When the vehicle switches from the autonomous driving mode to the manual driving mode in the stopped state, the vehicle speed control unit sets the target vehicle speed limit to the second vehicle speed.

In an embodiment of the disclosure, the steer-by-wire device is a shaftless steer-by-wire device.

FIG. 1 is a schematic diagram of a vehicle control device according to an embodiment of the disclosure, please refer to FIG. 1. The vehicle control device 100 may include a malfunction diagnosis unit 102, a steer-by-wire device 104, and a vehicle speed control unit 106. The malfunction diagnosis unit 102 is coupled to the steer-by-wire device 104, the vehicle speed control unit 106, the autonomous driving assistance device 108 of the vehicle, and the power supply 110. The steer-by-wire device 104 may control the steering of the vehicle according to the operation amount of the steering control device (such as a steering wheel) of the vehicle. The steer-by-wire device 104 may include components such as a steering wheel position sensor, a force feedback motor, a steering motor, a steering controller, and a tire angle sensor, etc. The malfunction diagnosis unit 102 and the vehicle speed control unit 106 may be implemented by, for example, a processor, an electronic control unit (ECU) or a microcontroller (MCU), but not limited thereto.

In this embodiment, the steer-by-wire device 104 is a shaftless steer-by-wire device, that is, the force feedback motor and the steering motor of the steer-by-wire device 104 are of a shaftless design without an intermediate shaft connection, which may improve the marketability of the vehicle. In addition, the steer-by-wire device 104, the autonomous driving assistance device 108 and the power supply 110 are fully redundant designs. That is, the components that form the steer-by-wire device 104, the autonomous driving assistance device 108, and the power supply 110 all have backup components. For example, the vehicle may include two steering wheel position sensors, two force feedback motors, two steering motors, two steering controls, two brakes, two displays, two tire angle sensors, and two power supplies. In this way, when a main component malfunctions, there are still backup components available, ensuring the safety of the vehicle.

The malfunction diagnosis unit 102 may determine whether the autonomous driving assistance device 108 of the vehicle, the steer-by-wire device 104 or the power supply 110 has malfunctioned. The autonomous driving assistance device 108 may include, for example, in addition to the steer-by-wire device 104 and the power supply 110 of the vehicle, devices related to autonomous driving assistance tools, such as image sensors, radar, LiDAR, vehicle speed sensors and other sensing devices that detect the surrounding environment of the vehicle or the vehicle status, but not limited to this.

During an autonomous driving process of the vehicle, when the malfunction diagnosis unit 102 determines that the autonomous driving assistance device 108, the steer-by-wire device 104, or the power supply 110 of the vehicle has malfunctioned, the vehicle speed control unit 106 may execute vehicle weakening control. In response to malfunctioning of the autonomous driving assistance device 108, the steer-by-wire device 104, or the power supply 110 of the vehicle, and whether the vehicle switches to manual driving mode, target vehicle speed limit of the vehicle is adjusted. The vehicle weakening control may, for example, include autonomous driving weakening control and steer-by-wire weakening control. When the vehicle speed control unit 106 executes the autonomous driving weakening control, the target vehicle speed limit is set to the first vehicle speed, and when the vehicle speed control unit 106 executes the steer-by-wire weakening control, the target vehicle speed limit is set to the second vehicle speed, where the second vehicle speed is greater than the first vehicle speed.

During an autonomous driving process of the vehicle, when the malfunction diagnosis unit 102 determines that the autonomous driving assistance device 108 other than the steer-by-wire device 104 and the vehicle's power supply 110 has malfunctioned. For example, when the image sensor, radar, LiDAR, or vehicle speed sensor has malfunctioned, the vehicle speed control unit 106 executes autonomous driving weakening control and sets the target vehicle speed limit to the first vehicle speed. In this embodiment, the first vehicle speed may be, for example, set to 0 km/h, but not limited thereto. In the case where the first vehicle speed is set to 0 km/h, when the malfunction diagnosis unit 102 determines that the autonomous driving assistance device 108 has malfunctioned, the vehicle speed control unit 106 may, for example, control the vehicle to decelerate and execute a roadside parking operation so that the vehicle is finally in a stopped state. In some embodiments, if the first vehicle speed is not set to 0 km/h, the vehicle speed control unit 106 may, for example, control the vehicle to decelerate and travel in a specific lane (such as an outer lane or a slow lane). Since the steer-by-wire device 104 has not malfunctioned, the vehicle speed control unit 106 does not need to execute the steer-by-wire weakening control after the vehicle switches to the manual driving mode.

In addition, since the malfunction of the steer-by-wire device 104 affects the autonomous driving operation of the vehicle, the malfunction of the power supply 110 affects the autonomous driving operation of the vehicle and the operation of the steer-by-wire device 104. Therefore, when the malfunction diagnosis unit 102 determines that the steer-by-wire device 104 or the power supply 110 has malfunctioned, the backup components of the steer-by-wire device 104 or the power supply 110 are activated. The vehicle speed control unit 106 first executes autonomous driving weakening control to set the target vehicle speed limit to the first vehicle speed. Then, when the vehicle switches to the manual driving mode, the vehicle speed control unit 106 executes the steer-by-wire weakening control and sets the target vehicle speed limit to the second vehicle speed.

Figure 2:
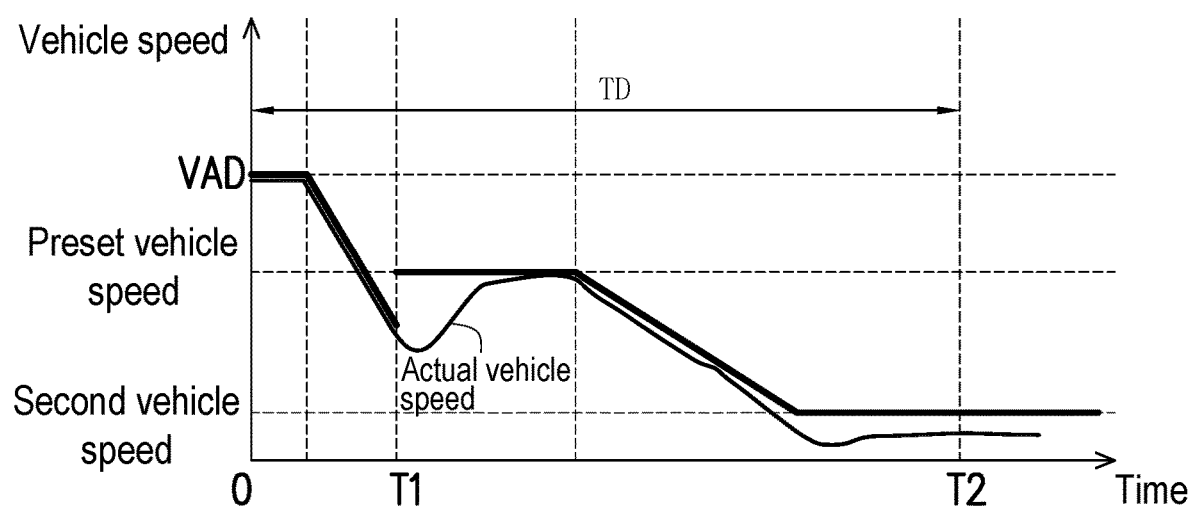
FIG. 2 is an operation sequence diagram of a vehicle control device according to an embodiment of the disclosure.

For example, in the embodiment of FIG. 2, the vehicle initially travels in autonomous driving mode. It is assumed that at time point 0, the malfunction diagnosis unit 102 determines that the steer-by-wire device 104 or the power supply 110 has malfunctioned. The vehicle speed control unit 106 controls the vehicle to decelerate, executes autonomous driving weakening control, and sets the target vehicle speed limit to the first vehicle speed (e.g., set to 0 km/h). As shown in FIG. 2, the thick solid line represents the speed limit imposed by the vehicle speed control unit 106 on the vehicle, and the thin solid line represents the actual vehicle speed. After the vehicle speed control unit 106 executes the autonomous driving weakening control, the vehicle speed control unit 106 first limits the vehicle speed to the vehicle speed VAD for a short time period (e.g., 4 seconds, but not limited thereto), and then gradually reduces the vehicle speed limit, so that the vehicle speed gradually reaches the target vehicle speed limit (the first vehicle speed). In the embodiment of FIG. 2, since the vehicle switches to the manual driving mode at the time point T1 before reaching the target vehicle speed limit (0 km/h), the vehicle speed control unit 106 changes to executing steer-by-wire weakening control at time point T1 and sets the target vehicle speed limit to the second vehicle speed (e.g., 10 km/h, but not limited thereto). Similarly, after the vehicle speed control unit 106 executes the autonomous driving weakening control, the vehicle speed control unit 106 first limits the vehicle speed to the preset vehicle speed (e.g., 80 km/h, but not limited thereto) for a short time period (e.g., 60 seconds, but not limited thereto), and then gradually reduces the speed limit so that the vehicle speed reaches the target vehicle speed limit (10 km/h). In this way, when the steer-by-wire device 104 or the power supply 110 has malfunctioned, the autonomous driving weakening control is executed first, and then the steer-by-wire weakening control is executed. This may meet the requirements of the vehicle for steer-by-wire weakening control and autonomous driving weakening control, and may significantly improve the traveling safety of the vehicle.

In some embodiments, the vehicle speed control unit 106 may set the target vehicle speed limit to the second vehicle speed within a preset time period after the malfunction diagnosis unit 102 determines that the steer-by-wire device 104 or the power supply 110 of the vehicle has malfunctioned, that is, to reduce the vehicle speed of the vehicle to below the second vehicle speed within the preset time period. For example, in the embodiment of FIG. 2, the vehicle speed control unit 106 may, within a preset time period TD (e.g., 540 seconds, but not limited thereto), that is, before the time point T3, reduce the vehicle speed to below 10 km/h.

Figure 3:
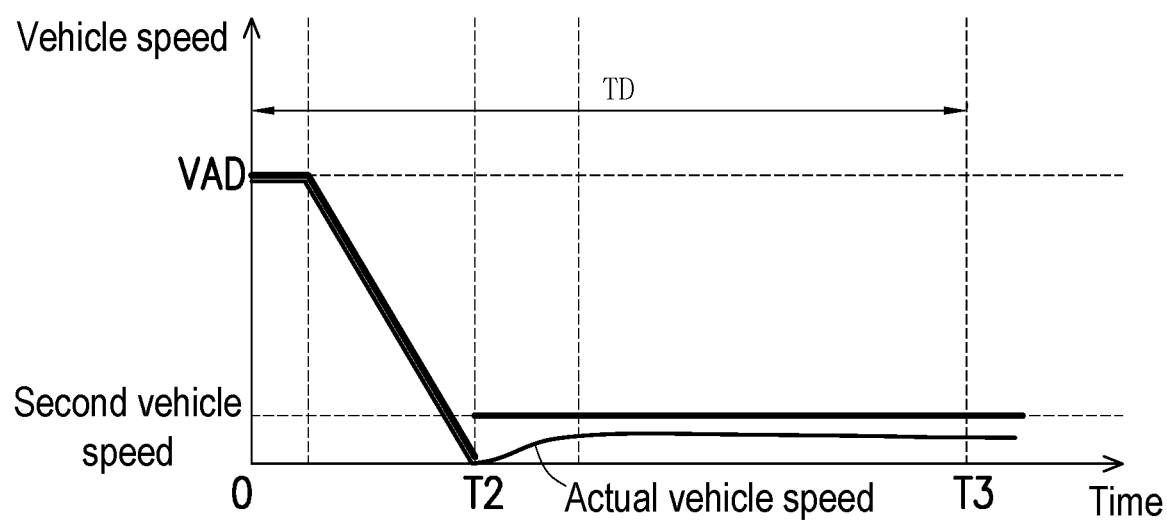
FIG. 3 is an operation sequence diagram of a vehicle control device according to another embodiment of the disclosure.

In addition, in other embodiments, the vehicle may also switch to the manual driving mode after reaching the target vehicle speed limit (0 km/h), that is, when the vehicle is in a stopped state. For example, as shown in the embodiment of FIG. 3, the difference between the embodiment of FIG. 3 and the embodiment of FIG. 2 is that in the embodiment of FIG. 3, the vehicle speed control unit 106 controls the vehicle to decelerate to the first vehicle speed (0 km/h) (time point T2) before the vehicle switches to the manual driving mode. The vehicle speed control unit 106 sets the target vehicle speed limit to the second vehicle speed (10 km/h) at time point T2.

Figure 4:
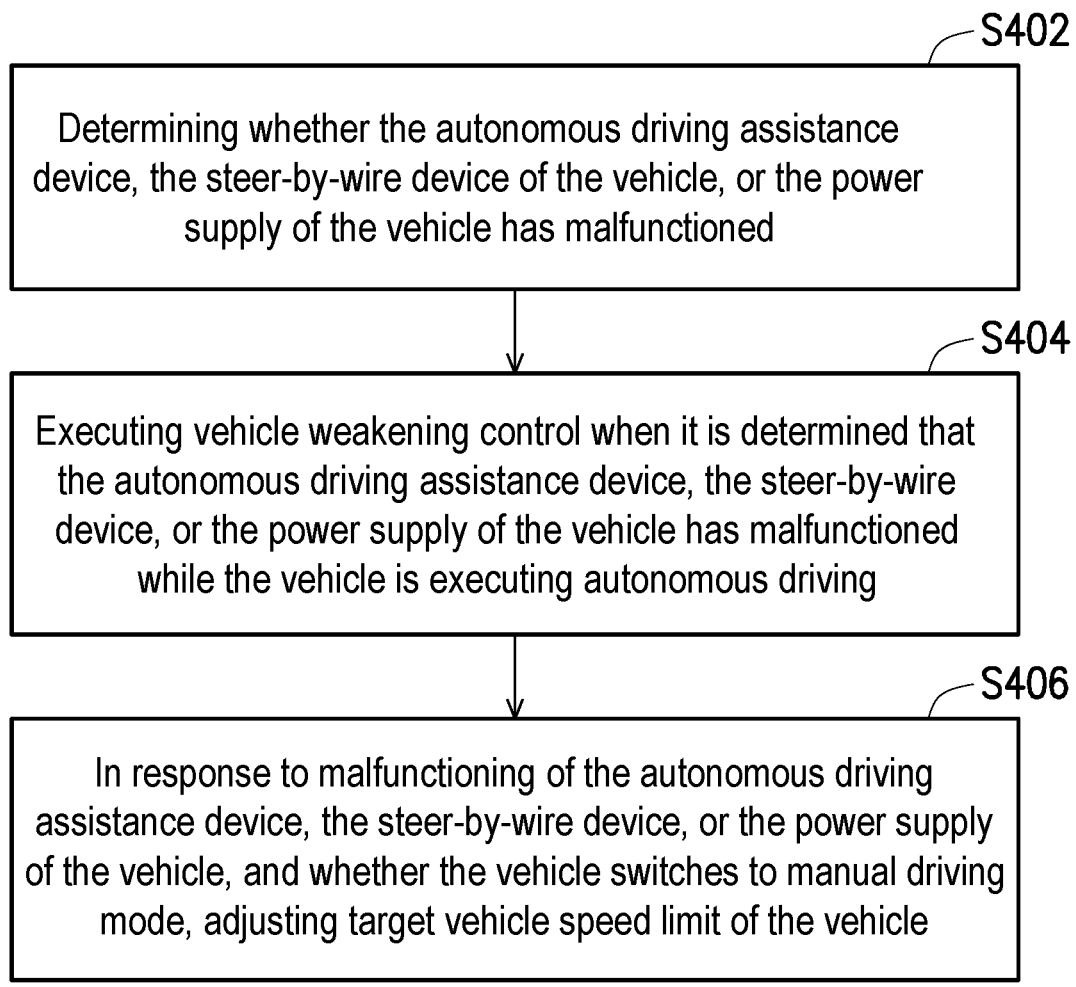
FIG. 4 is a flowchart of a vehicle control method of a vehicle control device according to an embodiment of the disclosure.

FIG. 4 is a flowchart of a vehicle control method of a vehicle control device according to an embodiment of the disclosure. As may be seen from the above embodiments, the vehicle control method of the vehicle control device may include, for example, the following steps. First, it is determined whether the autonomous driving assistance device, the steer-by-wire device of a vehicle, or the power supply of the vehicle has malfunctioned (step S402), in which the steer-by-wire device may be, for example, a shaftless steer-by-wire device. Next, when it is determined that the autonomous driving assistance device, the steer-by-wire device, or the vehicle's power supply has malfunctioned while the vehicle is executing autonomous driving, vehicle weakening control is executed (Step S404). The vehicle weakening control may, for example, include autonomous driving weakening control and steer-by-wire weakening control. When executing the autonomous driving weakening control, the target vehicle speed limit is set to the first vehicle speed, and when executing the steer-by-wire weakening control, the target vehicle speed limit is set to the second vehicle speed, where the second vehicle speed is greater than the first vehicle speed. The first vehicle speed may be, for example, 0 km/h, and the second vehicle speed may be, for example, 10 km/h, but not limited thereto.

Then, in response to malfunctioning of the autonomous driving assistance device, the steer-by-wire device, or the power supply of the vehicle, and whether the vehicle switches to manual driving mode, target vehicle speed limit of the vehicle is adjusted (step S406). For example, when the autonomous driving assistance device has malfunctioned, autonomous driving weakening control is executed to set the target vehicle speed limit to the first vehicle speed. When the power supply of the steer-by-wire device or the vehicle has malfunctioned, autonomous driving weakening control is executed to set the target vehicle speed limit to the first vehicle speed. When the target vehicle speed limit of the vehicle is set to the first vehicle speed due to malfunction of the steer-by-wire device or the power supply of the vehicle, and the vehicle switches from an autonomous driving mode to the manual driving mode while traveling, the steer-by-wire weakening control is executed to set the target vehicle speed limit to the second vehicle speed. Alternatively, when determining that the steer-by-wire device or the power supply of the vehicle has malfunctioned and the vehicle does not switch from the autonomous driving mode to the manual driving mode, the vehicle is continuously decelerated to a stopped state. When the vehicle switches from the autonomous driving mode to the manual driving mode in the stopped state, the target vehicle speed limit is set to the second vehicle speed. In some embodiments, the target vehicle speed limit may be set to the second vehicle speed within a preset time period after it is determined that the steer-by-wire device or the power supply of the vehicle has malfunctioned.

To sum up, in the embodiment of the disclosure, during the autonomous driving process of the vehicle, when the malfunction diagnosis unit determines that the steer-by-wire device, the autonomous driving assistance device, or the power supply of the vehicle has malfunctioned, vehicle weakening control is executed on the vehicle. In response to malfunctioning of the steer-by-wire device, the autonomous driving assistance device, or the power supply of the vehicle, and whether the vehicle switches to manual driving mode, target vehicle speed limit of the vehicle is adjusted. In this way, when the steer-by-wire device, the autonomous driving assistance device, or the power supply of the vehicle has malfunctioned, the target vehicle speed limit may be adjusted to the speed corresponding to the autonomous driving weakening control. In the case that the steer-by-wire device or the power supply of the vehicle has malfunctioned, the target vehicle speed limit may be adjusted to the speed corresponding to the steer-by-wire weakening control when the vehicle switches to manual driving mode. In this way, vehicles with autonomous driving functions may be compatible with steer-by-wire weakening control and autonomous driving weakening control. This significantly improves the traveling safety of the vehicle, and may provide a sustainable transportation system that may enhance the safety and convenience of traffic.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the claims.

What is claimed is:

1. A vehicle control device, comprising:
   a steer-by-wire device, controlling steering of a vehicle according to operation amount of a steering control device of the vehicle; and
   a hardware processor configured to determine whether an autonomous driving assistance device, the steer-by-wire device, or a power supply of the vehicle has malfunctioned,
   wherein during an autonomous driving process of the vehicle, when the hardware processor determines that the autonomous driving assistance device, the steer-by-wire device, or the power supply of the vehicle has malfunctioned, the hardware processor executes vehicle weakening control, and in response to malfunctioning of the autonomous driving assistance device, the steer-by-wire device, or the power supply of the vehicle, and whether the vehicle switches to manual driving mode, target vehicle speed limit of the vehicle is adjusted,
   wherein when the hardware processor executes an autonomous driving weakening control, the target vehicle speed limit is set to a first vehicle speed, when the hardware processor executes a steer-by-wire weakening control, the target vehicle speed limit is set to a second vehicle speed, when the hardware processor determines that the autonomous driving assistance device has malfunctioned, the target vehicle speed limit is set to the first vehicle speed,
   wherein when the hardware processor determines that the steer-by-wire device or the power supply of the vehicle has malfunctioned, the hardware processor sets the target vehicle speed limit to the first vehicle speed, when the target vehicle speed limit of the vehicle is set to the first vehicle speed due to malfunction of the steer-by-wire device or the power supply of the vehicle, and the vehicle switches from an autonomous driving mode to the manual driving mode while traveling, the target vehicle speed limit is set to the second vehicle speed.

2. The vehicle control device according to claim 1, wherein within a preset time period after the hardware processor determines that the steer-by-wire device or the power supply of the vehicle has malfunctioned, the hardware processor sets the target vehicle speed limit to the second vehicle speed.

3. The vehicle control device according to claim 1, wherein the second vehicle speed is greater than the first vehicle speed.

4. The vehicle control device according to claim 1, wherein the steer-by-wire device is a shaftless steer-by-wire device.

5. A vehicle control device, comprising:
   a steer-by-wire device, controlling steering of a vehicle according to operation amount of a steering control device of the vehicle; and
   a hardware processor configured to determine whether an autonomous driving assistance device, the steer-by-wire device, or a power supply of the vehicle has malfunctioned,
   wherein during an autonomous driving process of the vehicle, when the hardware processor determines that the autonomous driving assistance device, the steer-by-wire device, or the power supply of the vehicle has malfunctioned, the hardware processor executes vehicle weakening control, and in response to malfunctioning of the autonomous driving assistance device, the steer-by-wire device, or the power supply of the vehicle, and whether the vehicle switches to manual driving mode, target vehicle speed limit of the vehicle is adjusted,
   wherein when the hardware processor executes the autonomous driving weakening control, the target vehicle speed limit is set to a first vehicle speed, when the hardware processor executes the steer-by-wire weakening control, the target vehicle speed limit is set to a second vehicle speed, when the hardware processor determines that the autonomous driving assistance device has malfunctioned, the target vehicle speed limit is set to the first vehicle speed,
   wherein when the hardware processor determines that the steer-by-wire device or the power supply of the vehicle has malfunctioned and the vehicle does not switch from the autonomous driving mode to the manual driving mode, the hardware processor continues to decelerate the vehicle to a stopped state, when the vehicle switches from the autonomous driving mode to the manual driving mode in the stopped state, the hardware processor sets the target vehicle speed limit to the second vehicle speed.

6. The vehicle control device according to claim 5, wherein the steer-by-wire device is a shaftless steer-by-wire device.

7. A vehicle control method of a vehicle control device, comprising:
   determining whether an autonomous driving assistance device, a steer-by-wire device of a vehicle, or a power supply of the vehicle has malfunctioned;
   executing vehicle weakening control when it is determined that the autonomous driving assistance device, the steer-by-wire device, or the power supply of the vehicle has malfunctioned while the vehicle is executing autonomous driving; and
   in response to malfunctioning of the autonomous driving assistance device, the steer-by-wire device, or the power supply of the vehicle, and whether the vehicle switches to manual driving mode, adjusting target vehicle speed limit of the vehicle, wherein when an autonomous driving weakening control is executed, the target vehicle speed limit is set to a first vehicle speed, when a steer-by-wire weakening control is executed, the target vehicle speed limit is set to a second vehicle speed, when it is determined that the autonomous driving assistance device has malfunctioned, the target vehicle speed limit is set to the first vehicle speed, wherein when it is determined that the steer-by-wire device or the power supply of the vehicle has malfunctioned, the target vehicle speed limit is set to the first vehicle speed, when the target vehicle speed limit of the vehicle is set to the first vehicle speed due to malfunction of the steer-by-wire device or the power supply of the vehicle, and the vehicle switches from an autonomous driving mode to the manual driving mode while traveling, the target vehicle speed limit is set to the second vehicle speed.

* * * * *